(12) United States Patent
Ohnishi et al.

(10) Patent No.: US 10,404,142 B2
(45) Date of Patent: Sep. 3, 2019

(54) MOTOR CONTROL APPARATUS AND POWER STEERING APPARATUS

(71) Applicant: HITACHI AUTOMOTIVE SYSTEMS, LTD., Hitachinaka-shi, Ibaraki (JP)

(72) Inventors: Teruyuki Ohnishi, Atsugi (JP); Makoto Kimura, Yokohama (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 432 days.

(21) Appl. No.: 15/111,257

(22) PCT Filed: Jan. 28, 2015

(86) PCT No.: PCT/JP2015/052268
§ 371 (c)(1),
(2) Date: Jul. 13, 2016

(87) PCT Pub. No.: WO2015/119002
PCT Pub. Date: Aug. 13, 2015

(65) Prior Publication Data
US 2016/0336837 A1    Nov. 17, 2016

(30) Foreign Application Priority Data

Feb. 4, 2014    (JP) .................. 2014-019085

(51) Int. Cl.
*H02K 7/00*    (2006.01)
*H02K 11/00*    (2016.01)
(Continued)

(52) U.S. Cl.
CPC .......... *H02K 11/215* (2016.01); *B62D 5/046* (2013.01); *H02K 7/003* (2013.01);
(Continued)

(58) Field of Classification Search
CPC .... H02K 7/003; H02K 11/0094; H02K 11/01; H02K 11/21; H02K 11/215; H02K 11/33; B62D 5/046
See application file for complete search history.

(56) References Cited

U.S. PATENT DOCUMENTS

2003/0022554 A1*  1/2003  Licka .................. H01R 12/7011
                                                            439/567
2008/0211357 A1*  9/2008  Kataoka .............. H02K 11/215
                                                            310/68 B
(Continued)

FOREIGN PATENT DOCUMENTS

JP    09-116303 A     5/1997
JP    2007-282403 A   10/2007
(Continued)

*Primary Examiner* — Joseph M Rocca
*Assistant Examiner* — Maurice L Williams
(74) *Attorney, Agent, or Firm* — Foley & Lardner LLP

(57) ABSTRACT

The prevent invention provides a motor control apparatus and a power steering apparatus capable of preventing or reducing deterioration of a detection accuracy of a magnetic sensor. A magnet holder configured to rotate integrally with a magnet and made from a magnetic material is provided on an outer peripheral side of the magnet provided so as to face a magnetic sensor.

5 Claims, 5 Drawing Sheets

(51) Int. Cl.
*H02K 11/01* (2016.01)
*H02K 11/215* (2016.01)
*H02K 11/33* (2016.01)
*B62D 5/04* (2006.01)

(52) U.S. Cl.
CPC ......... *H02K 11/0094* (2013.01); *H02K 11/01* (2016.01); *H02K 11/33* (2016.01); *H02K 2213/03* (2013.01)

(56) References Cited

U.S. PATENT DOCUMENTS

| | | | | |
|---|---|---|---|---|
| 2011/0254388 A1* | 10/2011 | Yamasaki | ............ | B62D 5/0406 310/43 |
| 2012/0116717 A1* | 5/2012 | Satou | ................ | G01D 5/24457 702/151 |
| 2012/0152646 A1* | 6/2012 | Lee | ...................... | B62D 5/0403 180/444 |
| 2012/0169163 A1* | 7/2012 | Imai | ..................... | H02K 1/2746 310/71 |
| 2013/0140963 A1* | 6/2013 | Yoshidomi | ......... | H02K 11/0026 310/68 B |
| 2013/0257232 A1* | 10/2013 | Tomizawa | ............. | H02K 29/08 310/68 R |
| 2014/0009044 A1* | 1/2014 | Taniguchi | .............. | H02K 21/16 310/68 B |
| 2014/0015384 A1* | 1/2014 | Someya | ............... | G01D 5/2454 310/68 B |
| 2014/0191625 A1* | 7/2014 | Kitamoto | ................. | G01D 3/08 310/68 B |
| 2014/0265749 A1* | 9/2014 | Motoda | .................. | H02K 5/225 310/68 R |
| 2016/0046448 A1* | 2/2016 | Lautenschlager | ........ | H02K 5/15 198/617 |
| 2017/0047817 A1* | 2/2017 | Tanaka | ..................... | H02K 5/18 |

FOREIGN PATENT DOCUMENTS

| | | |
|---|---|---|
| JP | 2008-219996 A | 9/2008 |
| JP | 2010-139351 A | 6/2010 |
| JP | 2011-160636 A | 8/2011 |
| JP | 2013-007731 A | 1/2013 |

* cited by examiner

MOTOR CONTROL APPARATUS AND POWER STEERING APPARATUS

TECHNICAL FIELD

The present invention relates to a motor control apparatus and a power steering.

BACKGROUND ART

Conventional mechanically and electronically integrated motor control apparatuses, in which a motor element and a control substrate are provided integrally with each other, include a magnet fixed to an end of a motor shaft that is located closer to the control substrate, and detect a rotational angle of a motor rotor by detecting a change in a strength and a direction of a magnetic field of the magnet with use of a magnetic sensor mounted on the control substrate.

In the above-described motor control apparatuses, power is supplied from a power substrate to a stator via a bus bar. When the motor is driven, a high current flows through the bus bar, so that a strong magnetic field is generated around the bus bar. This magnetic field generated from the bus bar exerts an influence on the magnetic sensor, leading to deterioration of detection accuracy.

PTL 1 discusses a technique that covers the magnet with a cover member attached to a housing. The cover member is made from a magnetic material, and therefore absorbs the magnetic field generated from the bus bar. This configuration can eliminate or reduce the influence of the magnetic field from the bus bar on the magnetic field generated from the magnet.

CITATION LIST

Patent Literature

PTL 1: Japanese Patent Application Public Disclosure No. 2008-219996

SUMMARY OF INVENTION

Technical Problem

In the above-described conventional technique, the cover member is made from the magnetic material, and therefore may be magnetized by the magnet. Thus, there lies such a problem that the magnetic field generated from the magnet is subject to an influence of a magnetic field from the cover member due to occurrence of a relative rotation between this magnetized cover member and the magnet when the motor is driven, which results in deterioration of the detection accuracy of the magnetic sensor.

An object of the present invention is to provide a motor control apparatus and a power steering apparatus capable of preventing or reducing the deterioration of the detection accuracy of the magnetic sensor.

Solution to Problem

According to an aspect of the present invention, a magnet-side shielding member configured to rotate integrally with a magnet and made from a magnetic material is provided on an outer peripheral side of the magnet.

DESCRIPTION OF EMBODIMENTS

[First Embodiment]

Figure 1:
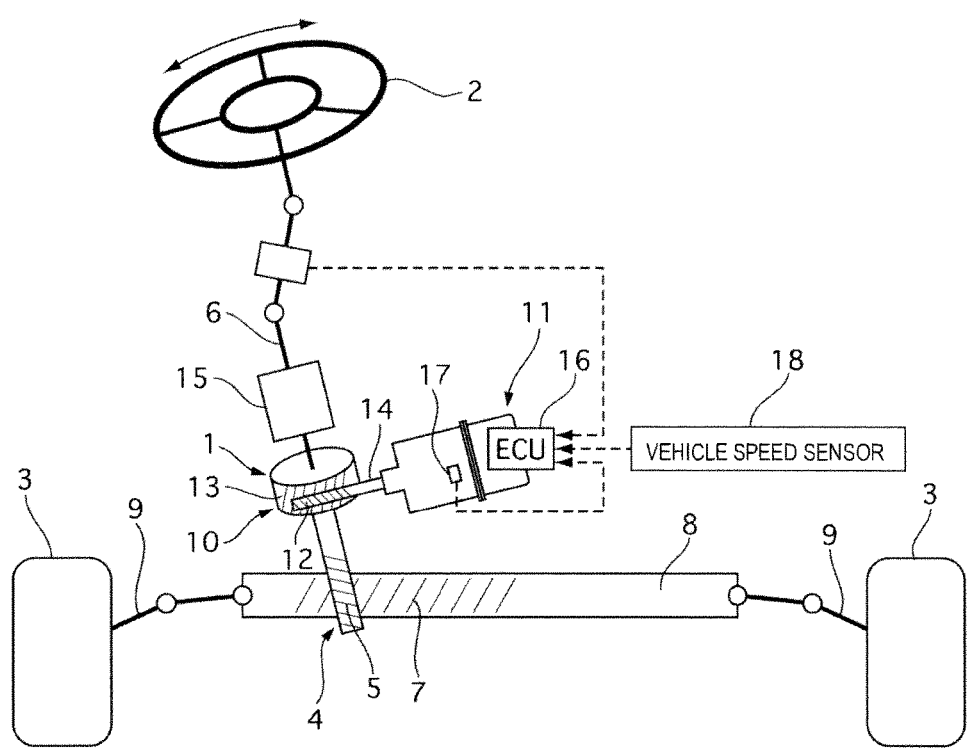
FIG. 1 illustrates a configuration of an electric power steering apparatus according to a first embodiment.

FIG. 1 illustrates a configuration of an electric power steering apparatus according to a first embodiment.

A steering mechanism 1 functions to turn front wheels (turning target wheels) 3 and 3 according to a rotation of a steering wheel 2, and includes a rack-and-pinion steering gear 4. A pinion gear 5 of the steering gear 4 is coupled to the steering wheel 2 via a steering shaft 6. A rack gear 7 of the steering gear 4 is provided on a rack shaft 8. Both ends of the rack shaft 8 are coupled to the front wheels 3 and 3 via tie rods 9 and 9, respectively. An electric motor 11 is coupled to the steering shaft 6 via a speed reducer 10. The speed reducer 10 includes a worm 12 and a worm wheel 13. The worm 12 is provided integrally with a motor shaft 14 of the electric motor 11. A rotational torque from the motor shaft 14 is transmitted to the steering shaft 6 via the speed reducer 10. A torque sensor 15, which detects a steering torque, is mounted on the steering shaft 6. An ECU (a microcomputer) 16 and a rotational angle sensor 17 are integrally provided at the electric motor 11. The rotational angle sensor 17 detects a motor rotational angle of the electric motor 11. The ECU 16 controls a driving current of the electric motor 11 and provides a steering assist force to the steering mechanism 1, based on a vehicle speed detected by a vehicle speed sensor 18 in addition to the steering torque and the motor rotational angle.

Figure 2:
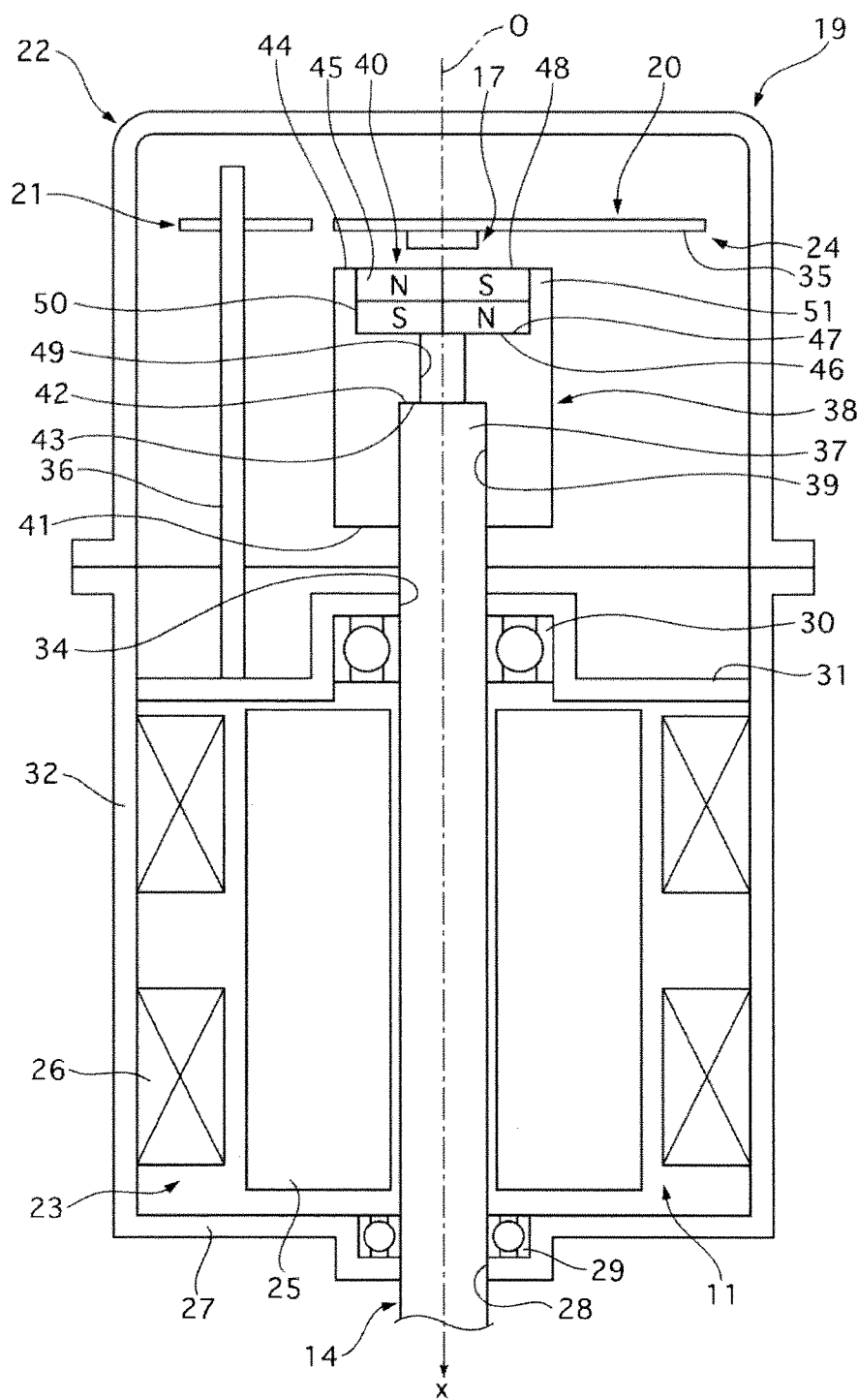
FIG. 2 is a vertical cross-sectional view of a motor control apparatus 19 according to the first embodiment.

FIG. 2 is a vertical cross-sectional view of a motor control apparatus 19 according to the first embodiment.

The motor control apparatus 19 according to the first embodiment is a mechanically and electrically integrated motor control apparatus, in which the electric motor 11, a control substrate (a power control unit) 20, and a power substrate (a power supply unit) 21 are provided integrally with one another. In FIG. 2, an x axis is defined to be a direction along a rotational axis O of the motor shaft 14, and a positive direction is defined to be a lower side on the sheet of FIG. 2.

A housing 22 is formed generally cylindrically. The housing 22 included a motor element containing portion 23 and a control substrate containing portion 24 therein. The motor element containing portion 23 contains the electric motor 11 therein. The control substrate containing portion 24 contains the control substrate 20 and the power substrate 21 therein. The motor element containing portion 23 is provided on a positive side of the x axis with respect to the control substrate containing portion 24.

[Motor Element Containing Portion]

The electric motor 11 is contained in the motor element containing portion 23 as described above. The electric motor 11 includes the motor shaft 14, a motor rotor 25, and a motor stator 26. The motor shaft 14 is made from a ferrous material. A x axis positive side of the motor shaft 14 penetrates through an opening 28 formed on a front portion 27 of the housing 22, and protrudes toward the x axis positive side beyond the front portion 27. The motor shaft 14 is supported rotatably with respect to the housing 22 via a pair of ball bearings 29 and 30. The ball bearing 29 is supported on the front portion 27. The ball bearing 30 is supported on a partition wall (a bearing support portion) 31. The partition wall 31 is fixed to a side surface portion 32 of the housing 22. The motor element containing portion 23 and the control substrate containing portion 24 are defined by the partition wall 31. A x axis negative side of the motor shaft 14 penetrates through an opening 34 formed at the bearing support portion 31, and protrudes toward the x axis negative side the control substrate containing portion 24-side beyond the bearing support portion 31.

The motor rotor 25 rotates integrally with the motor shaft 14. The motor stator 26 rotationally drives the motor rotor 25 when power is supplied thereto. The motor stator 26 is fixed to the side surface portion 32 of the housing 22. The motor stator 26 includes a core and a coil. The core is formed by stacking electromagnetic steel sheets. The coil is wound around the core via an insulator. The electric motor 11 according to the first embodiment is a three-phase brushless motor, and includes as many cores and coils as a multiple number of individual U, V, and W phases.

[Control Substrate Containing Portion]

The control substrate 20 and the power substrate 21 are contained in the control substrate containing portion 24 as described above. The control substrate 20 and the power substrate 21 are mounted at same axial positions of the housing 22 in the x axis direction via a not-illustrated support member fixed to the housing 22. The control substrate 20 and the power substrate 21 are electrically connected by a method such as wire bounding and a flat cable.

The control substrate 20 includes a CPU that forms the ECU 16, the rotational angle sensor 17, and the like mounted thereon, and controls the power to be supplied to the motor stator 26 based on each sensor value. The rotational angle sensor 17 is mounted on a surface 35 of the control substrate 20 on the x axis positive side. The rotational axis O of the motor shaft 14 passes through a center of the rotational angle sensor 17. The rotational angle sensor 17 is mounted at a position facing a magnet 45, which rotates integrally with the motor shaft 14. The rotational angle sensor 17 is a magnetic sensor that detects a rotational angle of the motor rotor 25 by detecting a change in a magnitude or a direction of a magnetic field of the magnet 45. Hereinafter, the rotational angle sensor 17 will be referred to as the magnetic sensor 17.

The power substrate 21 includes a power element (a switching element), a capacitor, and the like mounted thereon, and supplies the power provided from the outside to the motor stator 26 via a bus bar (a power supply line) 36. The bus bar 36 is mounted for each of the individual U, V, and W phases, and connected to the coil of each of the phases.

[Magnet Holder]

Figure 3:
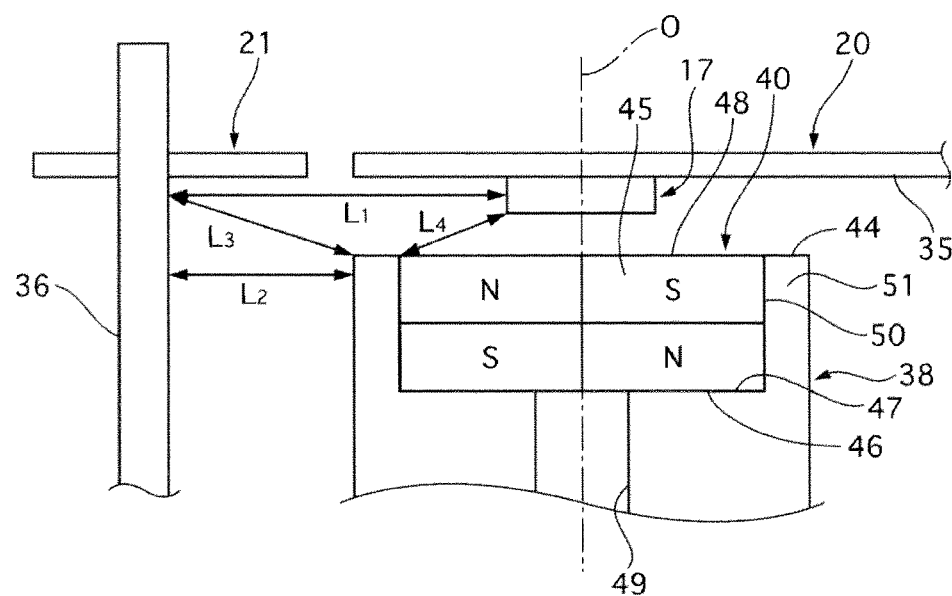
FIG. 3 is a vertical cross-sectional view of a magnet holder 38 according to the first embodiment.

FIG. 3 is a vertical cross-sectional view of a magnet holder (a magnet-side shielding member) 38 according to the first embodiment.

The magnet holder 38 is provided at an end 37 of the motor shaft 14 on the x axis negative side. The magnet holder 38 is cylindrically formed with use of the same ferrous material as the motor shaft 14. The magnet holder 38 includes a shaft fixation hole 39 and a magnet containing void portion 40. The shaft fixation hole 39 extends from an end surface 41 of the magnet holder 38 on the x axis positive side toward the x axis negative side. A center of the shaft fixation hole 39 coincides with a center of the magnet holder 38, i.e., the rotational axis O of the motor shaft 14. The end 37 of the motor shaft 14 on the x axis negative is fixed in the shaft fixation hole 39 by being press-fitted therein. An end edge 42 of the motor shaft 14 on the x axis negative side abuts against a bottom portion 43 of the shaft fixation hole 39.

The magnet containing void portion 40 extends from an end surface 44 of the magnet holder 38 on the x axis negative side toward the x axis positive side. A center of the magnet containing void portion 40 coincides with the center of the magnet holder 38. The magnet 45 is attached in the magnet containing void portion 40 with use of, for example, an adhesive. An end edge 46 of the magnet 45 on the x axis positive side abuts against the bottom portion 47 of the magnet containing void portion 40. The bottom portion 47 encloses an end of the magnet 45 on the x axis positive side. Further, a side surface 50 of the magnet 45 is enclosed by a side surface 51 of the magnet container void portion 40. An end edge 48 of the magnet 45 on the x axis negative side, and the end surface 44 of the side surface 51 of the magnet holder 38 on the negative x axis side are positioned at same axial positions in the x-axis direction. A through-hole 49 is formed between the shaft fixation hole 39 and the magnet containing void portion 40. The through-hole 49 is set so as to be smaller in diameter than the shaft fixation hole 39.

The magnet 45 is a double-sided four-pole cylindrical magnet having a north pole and a south pole at positions opposite of the rotational axis O of the motor shaft 14 from each other. The north pole and the south pole of the magnet 45 are formed by, for example, being magnetized by a magnetic field generated in the direction of the rotational axis O of the motor shaft 14 with use of a magnetization yolk.

The magnet holder 38 is set in such a manner that a shortest distance $L_1$ between the bus bar 36 and the magnetic sensor 17 exceeds a shortest distance $L_2$ between the bus bar 36 and the magnet holder 38. Further, a distance $L_3$ is a distance between a position of the bus bar 36 where the bus bar 36 and the magnetic sensor 17 are located away from each other by the shortest distance $L_1$, and the magnet holder 38. Then, the magnet holder 38 is set in such a manner that the distance $L_3$ exceeds a shortest distance $L_4$ between the magnet holder 38 and the magnetic sensor 17.

Next, functions will be described.

[Improvement of Detection Accuracy of Magnetic Sensor Due to Magnet Holder]

In the first embodiment, the magnet holder 38 configured to rotate integrally with the magnet 45 and made from the magnetic material is mounted on an outer periphery side of the magnet 45. When a high current flows through the bus bar 36, the magnet holder 38 absorbs a magnetic field generated from the bus bar 36, which can eliminate or reduce an influence of the magnetic field from the bus bar 36 on the magnetic field generated by the magnet 45. As a result, detection accuracy of the magnetic sensor 17 can be improved.

The north pole and the south pole of the magnet 45 are formed by being magnetized by the magnetic field generated in the direction of the rotational axis O of the motor shaft 14 (the x-axis direction). In other words, the magnet 45 is magnetized in the x-axis direction. In the first embodiment, the outer peripheral side of the magnet 45 is enclosed by the magnet holder 38 made from the magnetic material. Now, suppose that the magnet 45 is magnetized in a direction perpendicular to the x axis (a radial direction). In this case, the magnetic field of the magnet 45 is mainly generated from the outer peripheral side of the magnet 45. Therefore, a large part of the generated magnetic field is absorbed by the magnet holder 38, which leads to a reduction in the generated magnetic field of the magnet 45, and thus deterioration of the detection accuracy of the magnetic sensor 17. On the other hand, when the magnet 45 is magnetized in the x-axis direction, the magnetic field of the magnet 45 is mainly generated from a portion facing the magnetic sensor 17, which contributes to a reduction in the magnetic field absorbed by the magnet holder 38 compared to the magnetization in the radial direction. In other words, this magnetization can prevent or reduce a loss of the generated magnetic field of the magnet 45 due to the enclosure of the outer peripheral side of the magnet 45 with the magnet holder 38 made from the magnetic material The magnet holder 38 is set in such a manner that the shortest distance $L_1$ between the bus bar 36 and the magnetic sensor 17 exceeds the shortest distance $L_2$ between the bus bar 36 and the magnet holder 38. In other words, setting the magnet holder 38 so as to satisfy $L_1>L_2$ allows the magnetic field from the bus bar 36 to be absorbed first by the magnet holder 38 that is located closer to the bus bar 36 than the magnetic sensor 17 is, which can eliminate or reduce the magnetic field that otherwise would reach the magnetic sensor 17.

Further, the magnet holder 38 is set in such a manner that the distance $L_3$ exceeds the shortest distance $L_4$ between the magnet holder 38 and the magnetic sensor 17, with the distance $L_3$ indicating the distance between the position of the bus bar 36 where the bus bar 36 and the magnetic sensor 17 are located away from each other by the shortest distance $L_1$, and the magnet holder 38. In other words, sufficiently reducing the distance $L_4$ between the magnet holder 38 and the magnetic sensor 17 can eliminate or reduce the influence of the magnetic field from the bus bar 36 that otherwise would enter via a space between the magnet holder 38 and the magnetic sensor 17.

The magnet holder 38 includes the bottom portion 47 enclosing the end edge 46 of the magnet 45 on the x axis positive side. The end edge 46 of the magnet 45 on the x axis positive side is closed by the magnet holder 38 made from the magnetic material, which can eliminate or reduce the influence of the magnetic field from the bus bar 36 on the motor shaft 14-side.

The magnet holder 38 includes the side surface 51 provided so as to enclose the whole area of the magnet 45 in the x-axis direction. The whole area of the magnet 45 in the x-axis direction is closed by the magnet holder 38 made from the magnetic material, which can eliminate or reduce the influence of the magnetic field from the bus bar 36 on the whole area of the magnet 45 in the x-axis direction.

[Prevention or Reduction in Deterioration of Detection Accuracy of Magnetic Sensor Due to Integrated Rotations of Magnet and Magnetic Material]

The magnet holder 38 according to the first embodiment is made from the magnetic material, and therefore may be magnetized by the magnet 45. However, the magnet holder 38 according to the first embodiment rotates integrally with the magnet 45 when the motor is driven, whereby a phase of the magnetic field generated from the magnet holder 38 constantly matches a phase of the magnetic field generated from the magnet 45. In other words, only a low influence is imposed on the detection accuracy of the magnetic sensor 17 when the magnet holder 38 is magnetized, which can prevent or reduce the deterioration of the detection accuracy of the magnetic sensor 17.

[Reduction in Number of Parts Due to Shared Use]

The magnet holder 38 includes the magnet containing void portion 40 containing the magnet 45 therein. Therefore, the first embodiment employs the configuration in which the magnet holder 38 itself includes the magnet containing void portion 40, which can eliminate the necessity of additionally providing a magnet fixation member, thereby preventing or cutting down an increase in the number of parts.

The magnet holder 38 includes the shaft fixation hole 39 provided at the bottom portion 47, and is fixed to the motor shaft 14 by the motor shaft 14 press-fitted in the shaft fixation hole 39. Therefore, the magnet holder 38 and the motor shaft 14 are directly fixed to each other by the press-fitting, which can eliminate the necessity of additionally providing a coupling member, thereby reducing the number of parts.

[Protection of Magnet when Motor Shaft is Press-Fitted]

The through-hole 49, which is smaller in diameter than the shaft fixation hole 39, is provided in the magnet holder 38 between the magnet containing void portion 40 and the shaft fixation hole 39. When the motor shaft 14 is press-fitted into the magnet holder 38, the end edge 42 of the motor shaft 14 on the x axis negative side is brought into abutment with the bottom portion 43 of the shaft fixation hole 39. In other words, this configuration can avoid a contact between the motor shaft 14 and the magnet 45 to allow the magnet 45 not to directly receive a pressing load, thereby preventing or reducing a damage on the magnet 45 during the pressing.

[Prevention or Reduction in Contraction of Interference Due to Use of Same Material]

The magnet holder 38 and the motor shaft 14 are made from the same ferrous materials. In other words, the magnet holder 38 and the motor shaft 14 have equal linear expansion coefficients to each other, and therefore are deformed by generally equal amounts to each other with respect to a change in a temperature. Therefore, this configuration can prevent a reduction in an interference due to the change in the temperature, thereby preventing or reducing a loosening of the motor shaft 14 press-fitted in the magnet holder 38.

[Improvement of Steering Feeling]

As described above, the motor control apparatus 19 according to the first embodiment realizes the improvement of the detection accuracy of the magnetic sensor 17 due to the provision of the magnet holder 38, which rotates integrally with the magnet 45 and made from the magnetic material, on the outer peripheral side of the magnet 45. As a result, the power steering apparatus that controls the electric motor 11 with use of the value (the motor rotational angle) detected by the magnetic sensor 17 can operate with improved controllability of the electric motor 11. This results in supply of a smooth steering assist force to the steering mechanism 1, thereby succeeding in improving a steering feeling.

The first embodiment brings about advantageous effects that will be listed below.

(1) The first embodiment includes the housing 22 including the motor element containing portion 23 and the control substrate containing portion 24, the motor shaft 14 provided in the motor element containing portion 23 and rotatably supported, the motor rotor 25 provided in the motor element containing portion 23 so as to rotate integrally with the motor shaft 14, the motor stator 26 provided in the motor element containing portion 23 and configured to rotationally drive the motor rotor 25 by being provided with power, the power substrate 21 provided in the control substrate containing portion 24 and configured to supply the power to the motor stator 26, the bus bar 36 connecting the motor stator 26 and the power substrate 21 to each other and configured to supply the power from the power substrate 21 to the stator, the magnet 45 provided at one of the pair of ends of the motor shaft 14 that is located closer to the control substrate containing portion 24 and including the north pole and the south pole located at the positions opposite of the rotational axis O of the motor shaft 14 from each other, the magnetic sensor 17 provided at the position facing the magnet 45 in the control substrate containing portion 24 and configured to detect the rotational angle of the motor rotor 25 rotating integrally with the motor shaft 14 by detecting the change in the magnitude or the direction of the magnetic field of the magnet 45 due to the rotation of the motor shaft 14, the control substrate 20 provided in the control substrate containing portion 24 and configured to control the power to be supplied from the bus bar 36 to the motor stator 26 based on the rotational angle of the motor rotor 25, and the magnet holder 38 located on the outer peripheral side of the magnet 45 when viewed based on the rotational axis O of the motor shaft 14. The magnet holder 38 is provided so as to rotate integrally with the magnet. The magnet holder 38 is made from the magnetic material.

Therefore, the first embodiment can eliminate or reduce the influence of the magnetic field from the bus bar 36 on the magnetic field generated by the magnet 45, thereby improving the detection accuracy of the magnetic sensor 17.

Further, the first embodiment can reduce the influence that would be imposed on the detection accuracy of the magnetic sensor 17 when the magnet holder 38 is magnetized, thereby preventing or reducing the deterioration of the detection accuracy of the magnetic sensor 17.

(2) The north pole and the south pole of the magnet 45 are formed by being magnetized by the magnetic field generated in the direction of the rotational axis O of the motor shaft 14.

Therefore, the first embodiment can prevent or reduce the loss of the generated magnetic field of the magnet 45 due to the enclosure of the outer peripheral side of the magnet 45 with the magnet holder 38 made from the magnetic material.

(3) The magnet holder 38 is provided in such a manner that the shortest distance $L_1$ between the bus bar 36 and the magnetic sensor 17 exceeds the shortest distance $L_2$ between the bus bar 36 and the magnet holder 38.

Therefore, the first embodiment can eliminate or reduce the magnetic field from the bus bar 36 that otherwise would reach the magnetic sensor 17.

(4) The magnet holder 38 is provided in such a manner that the distance $L_3$ between the bus bar 36 and the magnet holder 38 exceeds the distance $L_4$ between the magnet holder 38 and the magnetic sensor 17.

Therefore, the first embodiment can eliminate or reduce the influence of the magnetic field from the bus bar 36 that otherwise would enter from between the magnet holder 38 and the magnetic sensor 17.

(5) Assuming that the direction of the rotational axis O of the motor shaft 14 is the axial direction, the magnet holder 38 includes the bottom portion 47 enclosing one of the ends of the magnet 45 in the axial direction that is located closer to the motor shaft 14.

Therefore, the first embodiment can eliminate or reduce the influence of the magnetic field from the bus bar 36 at the portion of the magnet 45 that is located closer to the motor shaft 14.

(6) The magnet holder 38 includes the magnet containing void portion 40 that contains the magnet 45 therein.

Therefore, the first embodiment eliminates the necessity of additionally providing a magnet fixation member, and thus can reduce the number of parts.

(7) The first embodiment includes the steering mechanism 1 configured to turn the turning target wheel according to the rotation of the steering wheel 2, the housing 22 including the motor element containing portion 23 and the control substrate containing portion 24, the motor shaft 14 provided in the motor element containing portion 23 and rotatably supported, the motor rotor 25 provided in the motor element containing portion 23 so as to rotate integrally with the motor shaft 14, the motor stator 26 provided in the motor element containing portion 23 and configured to rotationally drive the motor rotor 25 by being provided with power, the power substrate 21 provided in the control substrate containing portion 24 and configured to supply the power to the motor stator, the bus bar 36 connecting the motor stator 26 and the power substrate 21 to each other and configured to supply the power from the power substrate 21 to the motor stator 26, the magnet 45 provided at one of the pair of ends of the motor shaft 14 that is located closer to the control substrate containing portion 24 and including the north pole and the south pole located at the positions opposite of the rotational axis O of the motor shaft 14 from each other, the magnetic sensor 17 provided at the position facing the magnet 45 in the control substrate containing portion 24 and configured to detect the rotational angle of the motor rotor 25 rotating integrally with the motor shaft 14 by detecting the change in the magnitude or the direction of the magnetic field of the magnet 45 due to the rotation of the motor shaft 14, the control substrate 20 provided in the control substrate containing portion 24 and configured to control the power to be supplied from the power substrate 21 to the motor stator 26 based on the rotational angle of the motor rotor 25, and the magnet holder 38 located on the outer peripheral side of the magnet 45 when viewed based on the rotational axis O of the motor shaft 14. The magnet holder 38 is provided so as to rotate integrally with the magnet 45. The magnet holder 38 is made from the magnetic material. The first embodiment further includes the speed reducer 10 provided between the motor shaft 14 and the steering mechanism 1 and configured to provide the steering mechanism 1 with the steering force by transmitting the rotational torque from the motor shaft 14 to the steering mechanism 1.

Therefore, the first embodiment can eliminate or reduce the influence of the magnetic field from the bus bar 36 on the magnetic field generated by the magnet 45, thereby improving the detection accuracy of the magnetic sensor 17.

Further, only a low influence is imposed on the detection accuracy of the magnetic sensor 17 when the magnet holder 38 is magnetized, which can prevent or reduce the deterioration of the detection accuracy of the magnetic sensor 17.

Further, the first embodiment can improve the controllability of the electric motor 11, which results in the supply of the smooth steering assist force to the steering mechanism 1, thereby succeeding in improving the steering feeling.

[Second Embodiment]

Figure 4:
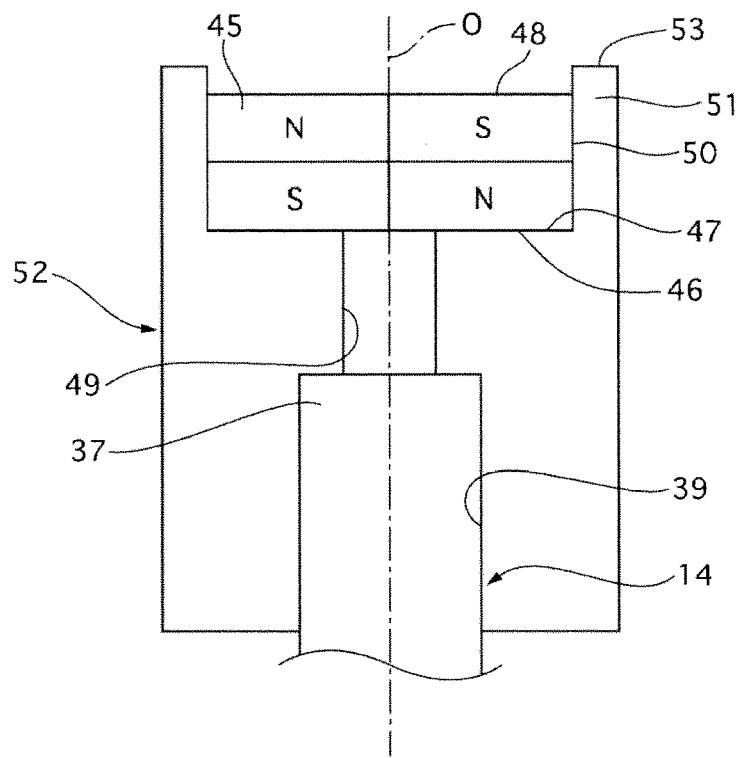
FIG. 4 is a vertical cross-sectional view of a magnet holder 52 according to a second embodiment.

FIG. 4 is a vertical cross-sectional view of a magnet holder 52 according to a second embodiment.

As illustrated in FIG. 4, the magnet holder 52 (the magnet-side shielding member) according to the second embodiment is different from the first embodiment in terms of the fact that an end surface 53 of the side surface 51 on the x axis negative side protrudes toward the x axis negative side beyond the end edge 48 of the magnet 45 on the x axis negative side.

The other configuration is similar to the first embodiment, and therefore an illustration and a description thereof will be omitted herein.

Next, functions will be described.

[Improvement of Detection Accuracy of Magnetic Sensor Due to Magnet Holder]

The magnet holder 52 according to the second embodiment is configured in such a manner that the end surface 53 of the side surface 51 on the x axis negative side protrudes toward the x axis negative side, i.e., toward the magnetic sensor 17, beyond the end edge 48 of the magnet 45 on the x axis negative side. Therefore, the space between the magnet holder 38 and the magnetic sensor 17 can be reduced compared to the first embodiment, thereby further effectively eliminating or reducing the influence of the magnetic field from the bus bar 36.

[Reduction in Number of Parts due to Shared Use]

The magnet holder 52 includes the shaft fixation hole 39 for fixing the magnet holder 52 to the motor shaft 14 by the motor shaft 14 press-fitted in the shaft fixation hole 39. Therefore, similarly to the first embodiment, the magnet holder 52 and the motor shaft 14 are directly fixed to each other by the press-fitting, which can eliminate the necessity of additionally providing a coupling member, thereby reducing the number of parts.

[Protection of Magnet when Motor Shaft is Press-Fitted]

The end surface 53 of the magnet holder 52 on the x axis negative side is formed so as to protrude beyond the magnet 45. Then, when the motor shaft 14 is press-fitted into the shaft fixation hole 39, this end surface 53 is pressed, which allows the magnet 45 not to directly receive the pressing load, thereby preventing or reducing the damage on the magnet 45 during the pressing.

The second embodiment brings about advantageous effects that will be listed below, in addition to the advantageous effects (1) to (7) of the first embodiment.

(8) The magnet holder 52 is provided so as to protrude toward the x axis negative side beyond the end edge 48 of the magnet 45 on the x axis negative side.

Therefore, the second embodiment can further effectively eliminate or reduce the influence of the magnetic field from the bus bar 36.

(9) The magnet holder 52 includes the shaft fixation hole 39 for fixing the magnet holder 52 to the motor shaft 14 by the motor shaft 14 press-fitted in the shaft fixation hole 39.

Therefore, the magnet holder 52 and the motor shaft 14 are directly fixed to each other by the press-fitting, which can eliminate the necessity of additionally providing a coupling member, thereby reducing the number of parts.

Further, when the motor shaft 14 is press-fitted into the shaft fixation hole 39, the magnet 45 does not directly receive the pressing load, which can prevent or reduce the damage on the magnet 45 during the pressing.

[Third Embodiment]

Figure 5:
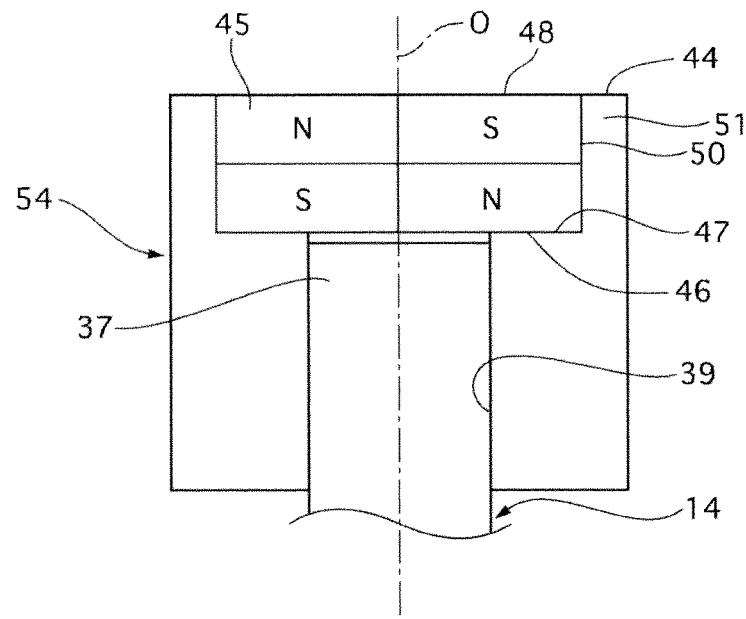
FIG. 5 is a vertical cross-sectional view of a magnet holder 54 according to a third embodiment.

FIG. 5 is a vertical cross-sectional view of a magnet holder 54 according to a third embodiment.

As illustrated in FIG. 5, the magnet holder (the magnet-side shielding member) 54 according to the third embodiment is different from the first embodiment in terms of a lack of the through-hole 49 of the magnet holder 38 according to the first embodiment illustrated in FIG. 1 and extension of the shaft fixation hole 39 to the bottom portion 47 of the magnet containing void portion 40.

The other configuration is similar to the first embodiment, and therefore an illustration and a description thereof will be omitted herein.

The third embodiment is configured in the above-described manner, which allows a process of forming the through-hole 49 to be omitted, contributing to the reduction in the number of processes. Further, an axial dimension of the magnet holder 54 in the x-axis direction can be reduced as much as the omission of the through-hole 49 compared to the magnet holder 38 according to the first embodiment.

[Fourth Embodiment]

Figure 6:
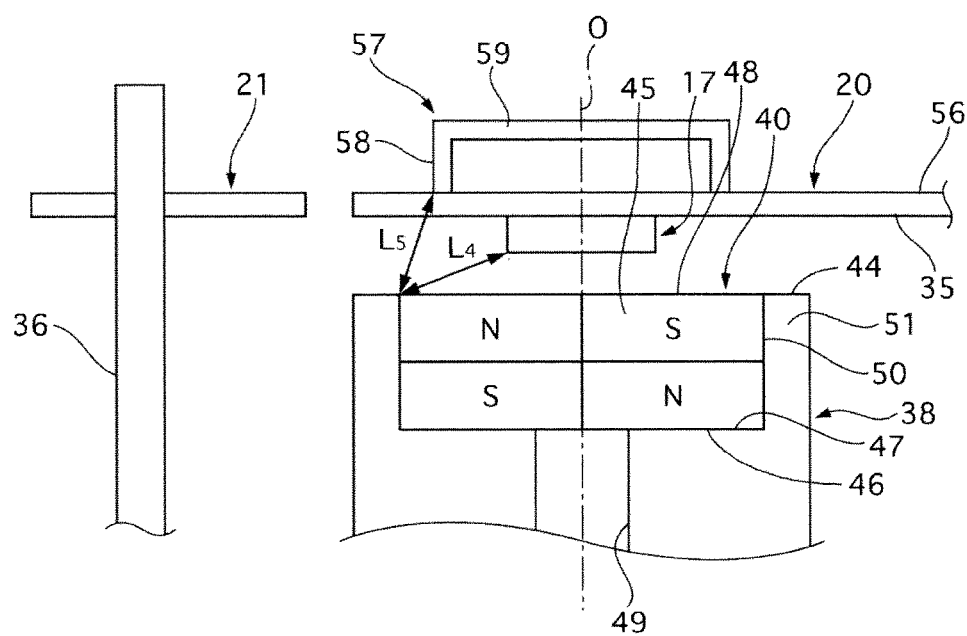
FIG. 6 is a vertical cross-sectional view of a substrate-side cover 57 according to a fourth embodiment.

FIG. 6 is a vertical cross-sectional view of a substrate-side cover 57 according to a fourth embodiment.

The motor control apparatus 19 according to the fourth embodiment is different from the first embodiment in terms of provision of the substrate-side cover (a substrate-side shielding member) 57 on a surface 56 of the control substrate 20 on the x axis negative side.

The substrate-side cover 57 is disposed so as to overlap the magnetic sensor 17 in the direction perpendicular to the rotational axis O of the motor shaft 14, i.e., the direction perpendicular to the x axis. The substrate-side cover 57 is formed with use of a magnetic material into a bottomed rectangular cylindrical shape including a soldered portion 58 and a spaced-apart portion 59 molded integrally with each other. The soldered portion 58 extends from the surface 56 on the x axis negative side toward the x axis negative side. The soldered portion 58 is soldered to the control substrate 20 at an end of the soldered portion 58 on the x axis positive side. The spaced-apart portion 59 is provided at an end of the soldered portion 58 on the x axis negative side, and extends in the direction perpendicular to the x axis. The spaced-apart portion 59 is spaced apart from the control substrate 20 in the x-axis direction. The substrate-side cover 57 is subjected to plating processing for improving solderability.

The substrate-side cover 57 and the magnet holder 38 are provided in such a manner that the shortest distance $L_4$ between the magnet holder 38 and the magnetic sensor 17 exceeds a shortest distance $L_5$ between the substrate-side cover 57 and the magnet holder 38.

The other configuration is similar to the first embodiment, and therefore an illustration and a description thereof will be omitted herein.

Next, functions will be described.

[Improvement of Detection Accuracy of Magnetic Sensor Due to Substrate-side Cover]

In the fourth embodiment, the motor control apparatus 19 includes the substrate-side cover 57 provided so as to overlap the magnetic sensor 17 in the direction perpendicular to the rotational axis of the motor shaft 14 on an opposite side of the control substrate 20 from the magnetic sensor 17. The substrate-side cover 57 is made from the magnetic material. When a high current flows through the bus bar 36, the substrate-side cover 57 absorbs the magnetic field generated from the bus bar 36, which can eliminate or reduce the influence of the magnetic field from the bus bar 36 on the magnetic field generated by the magnet 45. As a result, this configuration can improve the detection accuracy of the magnetic sensor 17.

The substrate-side cover 57 and the magnet holder 38 are provided in such a manner that the shortest distance $L_4$ between the magnet holder 38 and the magnetic sensor 17 exceeds the shortest distance $L_5$ between the substrate-side cover 57 and the magnet holder 38. In other words, sufficiently reducing the distance $L_5$ between the substrate-side cover 57 and the magnet holder 38 allows the magnetic field from the bus bar 36 that otherwise would enter toward the magnetic sensor 17 via the space between the substrate-side cover 57 and the magnet holder 38 to be absorbed by any of the substrate-side cover 57 and the magnet holder 38.

[Prevention or Reduction in Deterioration of Detection Accuracy of Magnetic Sensor when Substrate-side Cover is Magnetized Due to Spaced-apart Portion]

The substrate-side cover 57 according to the fourth embodiment is made from the magnetic material, and therefore may be magnetized by the magnet 45. However, the substrate-side cover 57 according to the fourth embodiment includes the spaced-apart portion 59 spaced apart from the control substrate 20 in the x-axis direction, and therefore can eliminate or reduce the influence that otherwise would be imposed on the magnetic sensor 17 when the substrate-side cover 57 is magnetized.

[Improvement of Assemblability Due to Soldering]

The substrate-side cover 57 is soldered to the control substrate 20. As a result, the substrate-side cover 57 can be easily fixed to the control substrate 20.

[Reduction in Number of Parts Due to Integration]

The substrate-side cover 57 includes the spaced-apart portion 59 spaced apart from the control substrate 20 in the direction of the rotational axis O of the motor shaft 14, and the soldered portion 58 molded integrally with the spaced-apart portion 59 and soldered to the control substrate 20. Therefore, this configuration can reduce the number of parts compared to individually providing the soldered portion 58 and the spaced-apart portion 59.

[Improvement of Force for Coupling Substrate-side Cover to Control Substrate Due to Plating Processing]

The substrate-side cover 57 is subjected to the plating processing capable of improving the solderability, which can enhance a force for coupling the substrate-side cover 57 to the control substrate 20.

The fourth embodiment brings about advantageous effects that will be listed below, in addition to the advantageous effects (1) to (7) of the first embodiment.

(10) The fourth embodiment includes the housing 22 including the motor element containing portion 23 and the control substrate containing portion 24, the motor shaft 14 provided in the motor element containing portion 23 and rotatably supported, the motor rotor 25 provided in the motor element containing portion 23 so as to rotate integrally with the motor shaft 14, the motor stator 26 provided in the motor element containing portion 23 and configured to rotationally drive the motor rotor 25 by being provided with power, the power substrate 21 provided in the control substrate containing portion 24 and configured to supply the power to the motor stator 26, the bus bar 36 connecting the motor stator 26 and the power substrate 21 to each other and configured to supply the power from the power substrate 21 to the motor stator 26, the magnet 45 provided at one of the pair of ends of the motor shaft 14 that is located closer to the control substrate containing portion 24 and including the north pole and the south pole located at the positions opposite of the rotational axis O of the motor shaft 14 from each other, the control substrate 20 provided in the control substrate containing portion 24 so as to extend generally perpendicularly to the rotational axis O of the motor shaft 14, the magnetic sensor 17 provided on the control substrate 20 so as to directly face the magnet 45 and configured to detect the rotational angle of the motor rotor 25 rotating integrally with the motor shaft 14 by detecting the change in the magnitude or the direction of the magnetic field of the magnet 45 due to the rotation of the motor shaft 14, the ECU 16 provided on the control substrate 20 and configured to control the power to be supplied from the power substrate 21 to the motor stator 26 based on the rotational angle of the motor rotor 25, and the substrate-side cover 57 provided so as to overlap the magnetic sensor 17 in the direction perpendicular to the rotational axis of the motor shaft 14 on the opposite side of the control substrate 20 from the magnetic sensor 17. The substrate-side cover 57 is made from the magnetic material.

Therefore, the fourth embodiment can eliminate or reduce the influence of the magnetic field from the bus bar 36 on the magnetic field generated by the magnet 45, thereby improving the detection accuracy of the magnetic sensor 17.

[Fifth Embodiment]

Figure 7:
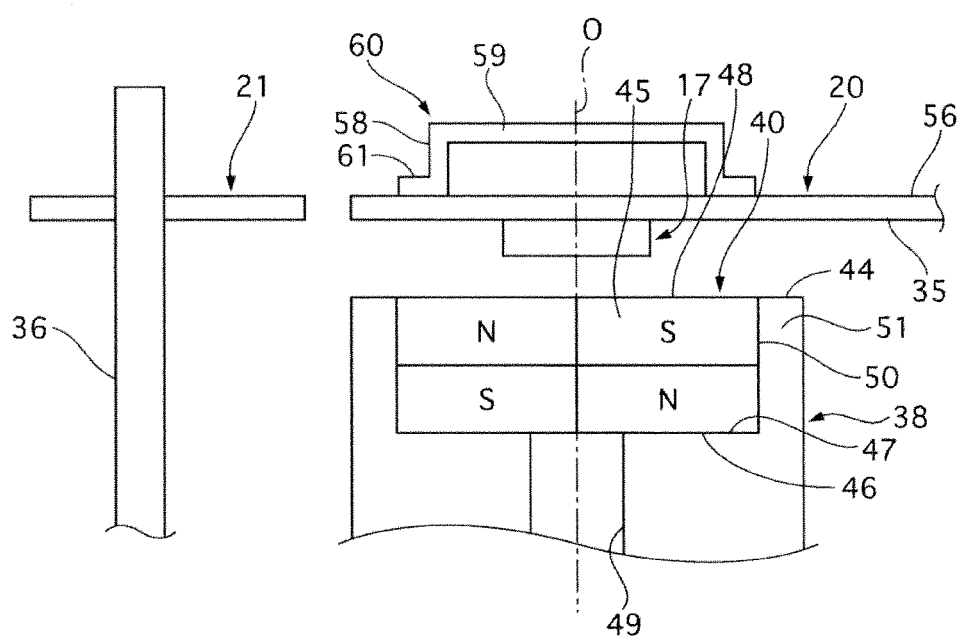
FIG. 7 is a vertical cross-sectional view of a substrate-side cover 60 according to a fifth embodiment.

FIG. 7 is a vertical cross-sectional view of a substrate-side cover 60 according to a fifth embodiment.

As illustrated in FIG. 7, the substrate-side cover (the substrate-side shielding member) 60 is different from the fourth embodiment in terms of provision of a flange portion 61 extending in the direction perpendicular to the x axis on an end of the soldered portion 58 on the x axis positive side.

The flange portion 61 of the substrate-side cover 60 is soldered to the control substrate 20.

The other configuration is similar to the fourth embodiment, and therefore an illustration and a description thereof will be omitted herein.

The fifth embodiment is configured in the above-described manner, which allows the substrate-side cover 60 to be coupled to the control substrate 20 with a wider area. As a result, the fifth embodiment can enhance the force for coupling the substrate-side cover 60 to the control substrate 20, and also facilitate the soldering process.

Other Embodiments

Having described how the present invention can be embodied based on exemplary embodiments, the specific configuration of the present invention is not limited to the configurations described and illustrated in the exemplary embodiments, and the present invention also include a design modification and the like thereof made within a range that does not depart from the spirit of the present invention.

The magnet holder 52 according to the second embodiment may be applied to the configurations according to the third to fifth embodiments.

The magnet holder 54 according to the third embodiment may be applied to the configurations according to the fourth and fifth embodiments.

Now, examples of technical ideas recognizable from the embodiments will be described.

(a) In the motor control apparatus, assuming that the direction of the rotational axis of the motor shaft is the axial direction, the magnet-side shielding member is provided so as to enclose the whole area of the magnet in the axial direction.

Therefore, it is possible to eliminate or reduce the influence of the magnet field from the power supply line over the whole area of the magnet in the axial direction.

(b) In the motor control apparatus described in the item (a), the magnet-side shielding member is provided so as to protrude beyond one of the ends of the magnet in the axial direction that is located closer to the magnetic sensor. Therefore, it is possible to further effectively eliminate or reduce the influence of the magnetic field from the power supply line.

(c) In the motor control apparatus described in the item (b), the magnet-side shielding member includes the shaft fixation hole for fixing the magnet-side shielding member to the motor shaft by the motor shaft press-fitted in the shaft fixation hole.

Therefore, the magnet-side shielding member and the motor shaft are directly fixed to each other by the press-fitting, which can eliminate the necessity of additionally providing a coupling member, thereby preventing or cutting down the increase in the number of parts.

When the motor shaft is press-fitted into the shaft fixation hole, the magnet does not directly receive the pressing load, which can prevent or reduce the damage on the magnet during the pressing.

(d) In the motor control apparatus, the magnet-side shielding member includes the shaft fixation hole for fixing the magnet-side shielding member to the motor shaft by the motor shaft press-fitted in the shaft fixation hole. The that shaft fixation hole is provided at the bottom portion.

Therefore, the magnet-side shielding member and the motor shaft are directly fixed to each other by the press-fitting, which can eliminate the necessity of additionally providing a coupling member, thereby preventing or cutting down the increase in the number of parts.

(e) In the motor control apparatus described in the item (d), each of the magnet-side shielding member and the motor shaft is made from the ferrous material.

Therefore, both the magnet-side shielding member and the motor shaft are made from the ferrous materials and have equal or similar linear expansion coefficients to each other, which can prevent or reduce the loosening of the motor shaft press-fitted in the magnet-side shielding member.

(f) In the motor control apparatus, the substrate-side shielding member includes the spaced-apart portion spaced apart from the control substrate in the direction of the rotational axis of the motor shaft.

Therefore, it is possible to eliminate or reduce the influence of the magnetic field generated from the substrate-side shielding member when the substrate-side shielding member is magnetized, on the magnetic sensor.

(g) The motor control apparatus further includes the magnet-side shielding member located on the outer peripheral side of the magnet when viewed based on the rotational axis of the motor shaft. The magnet-side shielding member is provided so as to rotate integrally with the magnet. The magnet-side shielding member is made from the magnetic material. The substrate-side shielding member and the magnet-side shielding member are provided in such a manner that the shortest distance between the magnet-side shielding member and the magnetic sensor exceeds the shortest distance between the substrate-side shielding member and the magnet-side shielding member.

Therefore, sufficiently reducing the distance between the substrate-side shielding member and the magnet-side shielding member allows the magnetic field from the power supply line that otherwise would enter toward the magnetic sensor side via the space between the substrate-side shielding member and the magnet-side shielding member to be absorbed by any of the substrate-side shielding member and the magnet-side shielding member.

(h) In the motor control apparatus, the substrate-side shielding member is soldered to the control substrate.

Therefore, the substrate-side shielding member can be easily fixed to the control substrate.

(i) In the motor control apparatus described in the item (h), the substrate-side shielding member includes the spaced-apart portion spaced apart from the control substrate in the direction of the rotational axis of the motor shaft, and the soldered portion molded integrally with the spaced-apart portion and soldered to the control substrate.

Therefore, it is possible to achieve the reduction in the number of parts by integrally molding the spaced-apart portion and the soldered portion.

(j) In the motor control apparatus described in the item (h), the substrate-side shielding member is subjected to the plating processing that improves the solderability.

Therefore, it is possible to improve the coupling force of the substrate-side shielding member by performing the plating processing that improves the solderability.

(k) In the power steering apparatus, the magnet-side shielding member is provided in such a manner that the shortest distance between the power supply line and the magnetic sensor exceeds the shortest distance between the power supply line and the magnet-side shielding member.

Therefore, the magnetic field from the power supply line is absorbed first by the magnet-side shielding member that is located closer than the magnetic sensor is, which can eliminate or reduce the magnetic field from the power supply line that otherwise would reach the magnetic sensor.

(l) In the power steering apparatus, the magnet-side shielding member is provided in such a manner that the distance between the power supply line and the magnet-side shielding member exceeds the distance between the magnet-side shielding member and the magnetic sensor.

Therefore, sufficiently reducing the distance between the magnet-side shielding member and the magnetic sensor can eliminate or reduce the influence of the magnetic field from the power supply line that otherwise would enter from between the magnet-side shielding member and the magnetic sensor.

Therefore, according to the above-described embodiments, it is possible to prevent or reduce the deterioration of the detection accuracy of the magnetic sensor.

Having described merely several embodiments of the present invention, it is apparent to those skilled in the art that the embodiments described as examples can be changed or improved in various manners without substantially departing from the novel teachings and advantages of the present invention. Therefore, such embodiments changed or improved in various manners are intended to be also contained in the technical scope of the present invention.

This application claims priority to Japanese Patent Application No. 2014-019085 filed on Feb. 4, 2014. The entire disclosure of Japanese Patent Application No. 2014-019085 filed on Feb. 4, 2014 including the specification, the claims, the drawings, and the summary is incorporated herein by reference in its entirety.

The entire disclosure of Japanese Patent Application Public Disclosure No. 2008-219996 (PTL 1) including the specification, the claims, the drawings, and the summary is incorporated herein by reference in its entirety.

REFERENCE SIGNS LIST

1 steering mechanism
2 steering wheel
3 front wheel (turning target wheel)
10 speed reducer
14 motor shaft
16 ECU (microcomputer)
17 rotational angle sensor (magnetic sensor)
20 control substrate (power control unit)
21 power substrate (power supply unit)
22 housing
23 motor element containing portion
24 control substrate containing portion
25 motor rotor
26 motor stator
36 bus bar (power supply line)
38 magnet holder (magnet-side shielding member)

45 magnet
52 magnet holder (magnet-side shielding member)
54 magnet holder (magnet-side shielding member)
57 substrate-side cover (substrate-side shielding member)
60 substrate-side cover (substrate-side shielding member)

The invention claimed is:

1. A motor control apparatus comprising:
a housing including a motor element containing portion and a control substrate containing portion;
a motor shaft provided in the motor element containing portion and rotatably supported;
a motor rotor provided in the motor element containing portion so as to rotate integrally with the motor shaft;
a motor stator provided in the motor element containing portion and configured to rotationally drive the motor rotor by being provided with power;
a power supply provided in the control substrate containing portion and configured to supply the power to the motor stator;
a power supply line connecting the motor stator and the power supply to each other and configured to supply the power from the power supply to the motor stator;
a magnet provided at a first end of a pair of ends of the motor shaft, the first end being located closer to the control substrate containing portion than a second end of the pair of ends of the motor shaft, the magnet including a north pole and a south pole located at positions opposite of a rotational axis of the motor shaft from each other;
a control substrate provided in the control substrate containing portion so as to extend generally perpendicularly to the rotational axis of the motor shaft;
a magnetic sensor provided on the control substrate so as to directly face the magnet, and configured to detect a rotational angle of the motor rotor rotating integrally with the motor shaft by detecting a change in a magnitude or a direction of a magnetic field of the magnet due to the rotation of the motor shaft;
a microcomputer provided on the control substrate and configured to control the power to be supplied from the power supply to the motor stator, based on the rotational angle of the motor rotor; and
a substrate-side shielding member located on an opposite side of the control substrate from the magnetic sensor, the substrate-side shielding member being provided so as to overlap the magnetic sensor in a direction perpendicular to the rotational axis of the motor shaft, the substrate-side shielding member being made from magnetic material,
wherein the substrate-side shielding member is soldered to the control substrate,
wherein the substrate-side shielding member includes a spaced-apart portion spaced apart from the control substrate in a direction of the rotational axis of the motor shaft, and a soldered portion molded integrally with the spaced-apart portion and soldered to the control substrate, and
wherein the soldered portion includes a flange portion extending in a direction perpendicular to the rotational axis of the motor shaft.

2. The motor control apparatus according to claim 1, further comprising a magnet-side shielding member located on an outer peripheral side of the magnet when viewed based on the rotational axis of the motor shaft, the magnet-side shielding member being provided so as to rotate integrally with the magnet, the magnet-side shielding member being made from magnetic material,
wherein the substrate-side shielding member and the magnet-side shielding member are provided such that a shortest distance between the magnet-side shielding member and the magnetic sensor exceeds a shortest distance between the substrate-side shielding member and the magnet-side shielding member.

3. The motor control apparatus according to claim 1, wherein the substrate-side shielding member is subjected to plating processing that improves solderability.

4. The motor control apparatus according to claim 1, wherein:
the flange portion comprises a first flange portion and a second flange portion;
the first flange portion and the second flange portion are on opposite sides of the spaced-apart portion in the direction perpendicular to the rotation axis; and
each of the first flange portion and the second flange portion contact the control substrate.

5. The motor control apparatus according to claim 1, wherein the substrate-side shielding member is plated so as to enhance coupling of the substrate-side shielding member to the control substrate.

* * * * *